(No Model.)
H. J. GREEN.
ANEMOMETER CUP.
No. 471,817. Patented Mar. 29, 1892.
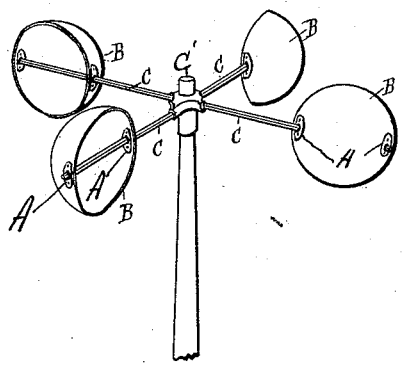
Fig. I.
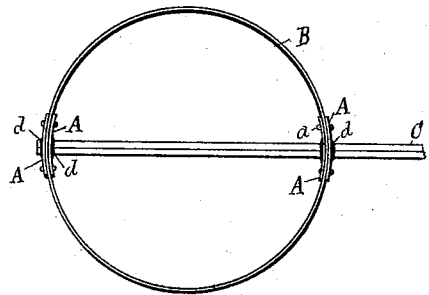
Fig. II.
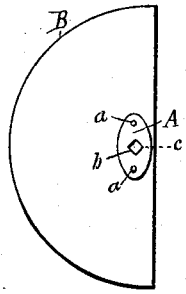
Fig. III.
WITNESSES:
Jas. S. Ewbank.
Geo Moore.
INVENTOR
Henry J. Green
BY
Francis C. Bowen
ATTORNEY.

UNITED STATES PATENT OFFICE.

HENRY J. GREEN, OF BROOKLYN, NEW YORK.

ANEMOMETER-CUP.

SPECIFICATION forming part of Letters Patent No. 471,817, dated March 29, 1892.

Application filed February 13, 1890. Serial No. 340,280. (No model.)

*To all whom it may concern:*

Be it known that I, HENRY J. GREEN, a citizen of the United States, and a resident of Brooklyn, in the county of Kings and State of New York, have invented certain new and useful Improvements in Anemometer-Cups, of which the following is a specification.

Prior to my invention hemispherical anemometer-cups have been made of brass or copper; but experience shows that the brass or copper cups, although protected by coats of paint, rapidly become oxidized by the action of the atmosphere, crack, and break away from their fastenings; also, on account of their weight, are insensible to light winds and do not move freely through the air.

To obviate these and other disadvantages is the object of my invention; and to that end the invention consists in forming the cups of aluminum.

It also consists of the novel means hereinafter described for attaching the cups to their supporting arms or rods, whereby a light, durable, and non-oxidizable cup is obtained.

In the accompanying drawings, Figure 1 represents a view of the cups in position on an instrument known as "Robinson's hemispherical cup-anemometer." Fig. 2 is a front view of the cup detached. Fig. 3 is a side view of the cup, showing a plate in position thereon.

Similar letters of reference indicate corresponding parts.

In carrying out my invention I take a circular sheet or plate of aluminum as is ordinarily used in commerce and spin it in the usual hemispherical-cup-anemometer form B, in a similar manner as is now practiced in the production of the cups of copper or brass and now used for anemometers.

The letters A A A A denote soft-metal plates, which are secured to the interior and exterior surface of the cup in pairs diametrically opposite to each other and at or near the edge of the cup by rivets $a$ $a$, passing entirely through the plates as well as the cup. In each pair of these plates A A A A are holes or openings $b$ $b$, which coincide with similar openings $c$ $c$, formed in the edge portion of the cup for connecting with the cup B the arms or rods C C in the manner now to be described. The plates A A A A having been fastened to the aluminum cups in the manner above described, I introduce the rods or arms C C in the openings $b$ $b$ of the plates A A and similar openings $c$ $c$ in the cups B, and solder the cups B to the rods or arms C by applying the solder to that portion thereof where the rods or arms join the exterior faces of the plates A A, as shown at $d$, Fig. 2, each rod being soldered to both pairs of the plates of the respective cups, whereby I am enabled to secure the aluminum cups to the rods or arms so that they will not break away from their fastenings. Said rods or arms C are mounted radially on a vertical spindle C' to turn in a horizontal plane under the impulse of the wind acting on the cups B, which are at the extremities of the arms.

Besides permitting the use of solder, as explained, the plates A A serve to stiffen and reinforce the cup B at the points where the latter is exposed to the strain of the rod C, and by securing this rod to the two opposite pairs of plates of either cup it acts as a brace to the cup, tending to preserve the shape thereof.

By substituting the metal aluminum for the brass or copper now used for the cups I obtain the following useful advantages: first, that the weight of the cups is in the proportion of about three ounces when made of aluminum to eleven ounces when made of brass; second, that there is less friction in the anemometer-bearings on account of the less weight of the aluminum; third, that the aluminum cups have a perfectly-smooth surface, and thus move through the air more freely and are more sensitive to the wind than heretofore; fourth, that the aluminum being of less weight than the brass there will be less wear, especially at the point of the spindle which has to support the weight of the cups and which now and again needs renewing on account of the wear; fifth, that the aluminum being non-oxidizable and non-corrosive the cups will not break away in consequence of the deterioration of the metal.

What I claim as new, and desire to secure by Letters Patent, is—

The combination of the hemispherical cup having its body formed entirely of aluminum, the two pairs of soft-metal plates riveted to the cup at points diametrically opposite each other, with one of each pair on the interior and exterior of the cup, and the supporting rod or arm fitted in coincident holes of both pairs of said plates and the cup and soldered to both pairs of plates, substantially as and for the purpose described.

HENRY J. GREEN.

Witnesses:
FRANCIS C. BOWEN,
ANTON NELUBAS.